Dec. 4, 1951     K. A. HARMON ET AL     2,577,680
CONTROL MECHANISM FOR THE BRAKEHOLDERS
OF AUTOMOTIVE VEHICLES
Filed Oct. 17, 1950
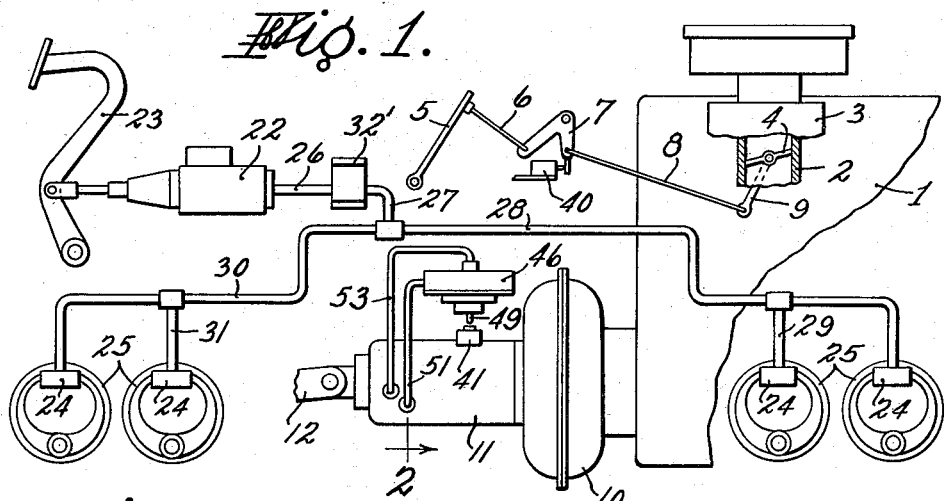
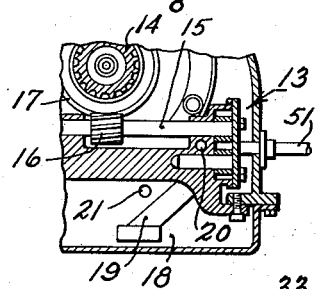
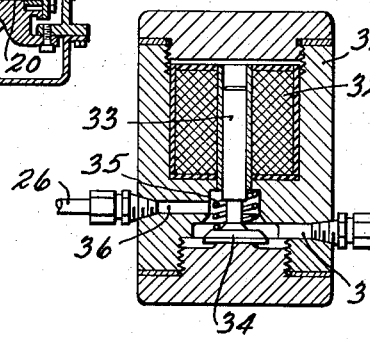
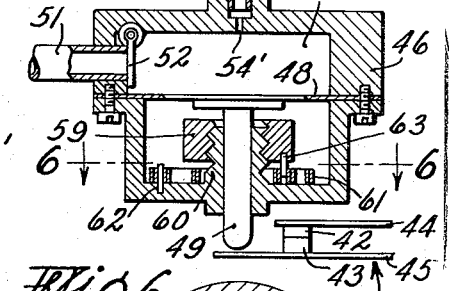
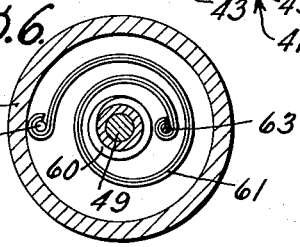
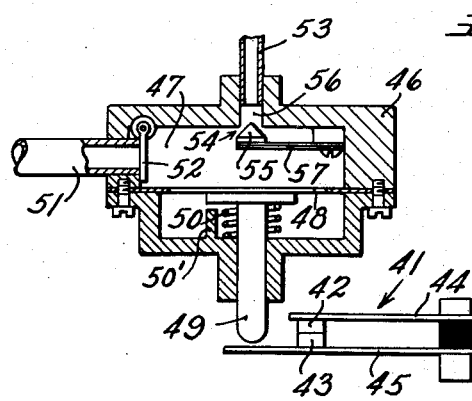
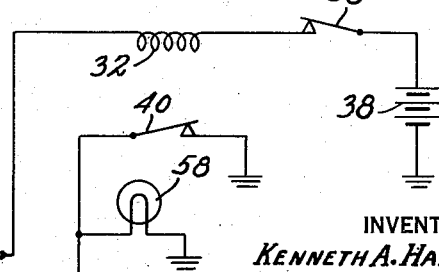
INVENTORS
KENNETH A. HARMON
AND GLEN A. GUERNSEY
BY Chapin & Neal
ATTORNEYS

Patented Dec. 4, 1951

2,577,680

UNITED STATES PATENT OFFICE 2,577,680

CONTROL MECHANISM FOR THE BRAKE HOLDERS OF AUTOMOTIVE VEHICLES

Kenneth A. Harmon, Longmeadow, and Glen A. Guernsey, West Springfield, Mass., assignors to Wico Electric Company, West Springfield, Mass., a corporation of Massachusetts Application October 17, 1950, Serial No. 190,608

10 Claims. (Cl. 192—3)

This invention relates to improvements in control mechanism for the brakeholders of automotive vehicles.

Brakeholders are particularly useful in automobiles of the type, in which the power of the motor is transmitted through a fluid coupling to the propeller shaft and driving wheels of the vehicle, for the purpose of preventing creeping of the vehicle, which would otherwise occur, after the vehicle has been brought to a stop and the brake pedal has been released. In a hydraulic braking system, the brakeholder commonly consists of a valve, which is interposed in the conduit between the master cylinder and the various brake cylinders and which, when closed prevents the return of brake fluid from the brake cylinders and thus holds the brakes applied. Various means have been proposed for causing the brakeholder valve to close automatically after the brakes have been applied and the car speed has been brought to zero or some very low speed.

This invention has for one object the provision of a brakeholder control means, which embodies an arrangement such that abrupt stops, as for example when the wheels are locked in a skid, will not result in an application of the brakeholder until after the lapse of a safety time interval.

The invention has for another object the provision of a brakeholder control that is released by fluid pressure, when at or above a predetermined value, to render the brakeholder inoperative and that is supplied with fluid by a pump driven with the propeller shaft and supplying fluid to such means at pressures which increase with the propeller shaft speed, together with a check valve preventing return flow from the control to the pump, and a controlled vent for said control, whereby decrease of pressure in said control occurs at a time rate such that, if the vehicle decelerates at a normal rate, the pressure in said control will drop sufficiently to enable the control to render the brakeholder operative at or near zero speed and such that on faster deceleration the brakeholder will not be operative until after the lapse of a safety time interval.

Another object of the invention is to provide means associated with the brakeholder control to compensate for variations in temperature of the oil or other fluid supplied by the pump, whereby the time necessary for the pressure in the control to drop from any given pressure to a pressure low enough to render the brakeholder operative will be substantially the same regardless of whether the oil is cold or hot.

The invention has for another object the provision of an improved release means for an electrically-actuated brakeholder, such means including, in addition to the usual switch, opened by depression of the accelerator pedal, a resistor shunted across such switch and having a resistance that is low when cold and that rapidly increases as current flows therethrough, whereby current flow through the brakeholder is decreased relatively gradually to avoid sudden release of pressure from the brake cylinders.

These and other objects will more particularly appear from the detailed description of an illustrative example of the invention in the accompanying drawings, in which;

Fig. 1 is a diagrammatical view of an automotive vehicle embodying the brakeholder control of this invention;

Fig. 2 is a sectional view taken on the line 2 of Fig. 1 and showing the pump for supplying liquid to the pressure-actuated control for the brakeholder;

Fig. 3 is a sectional view of the brakeholder;

Fig. 4 is a diagrammatical view of the electrical connections and the pressure-actuated control for the brakeholder;

Fig. 5 is a sectional view showing a modification of the pressure-actuated control for the brakeholder; and Fig. 6 is a sectional plan view taken on the line 6—6 of Fig. 5.

Referring to these drawings and first to Fig. 1 thereof, the engine of the automotive vehicle is shown at 1 and it has the usual intake manifold 2, through which fuel is supplied to the engine from a carbureter 3, under the control of a throttle valve 4. The latter is actuated by depression of an accelerator pedal 5 and suitable connections, such for example as link 6, bellcrank 7, link 8 and lever 9. The crankshaft of the engine is connected to the vehicle wheels (not shown) by means of a suitable torque transmitting connection which as shown, includes a fluid coupling 10, an automatic change speed gearing or transmission 11 and a propeller shaft 12 which, it will be understood, is connected to drive the wheels in the usual or any suitable manner. The fluid coupling and the gearing together form what is known as a "Hydromatic drive" and do not require the use of a disconnecting clutch and the usual clutch pedal as is necessary with manually shiftable change speed gearing. The gearing is of the planetary type and is controlled by fluid pressure developed by two pumps, one of which is driven constantly by the engine and the other by the driven shaft of the gearing which is connected to the propeller shaft. The last mentioned pump is employed as part of my invention since it is already on the vehicle. However, a separate pump driven from the propeller shaft, or any other element, which is rotated only when the vehicle is moving can be employed if the vehicle is not equipped with the particular automatic change speed transmission shown. As shown in Fig. 2, the pump 13, driven by the driven shaft 14 of the change speed gearing is of the gear type and is connected to the driven shaft by a shaft 15 and gears 16 and 17. The pump draws liquid, such as oil, from the bottom of the reservoir 18 through a pipe 19 and forces the liquid under pressure through the outlet 20 and suitable conduits to the elements (not shown) which control the ratio changing of the gearing.

The fluid pressure braking system, in the example shown, is of the hydraulic type and includes a master cylinder 22 operated by a pedal 23 to force liquid under pressure to the motors 24 of the braking devices 25. Liquid is conducted from the master cylinder to the motors through conduits 26 and 27 and branch conduits 28 and 29 and 30 and 31.

The brakeholder is interposed between the conduits 26 and 27 and includes a multi-part casing 32' (Fig. 3) in which is mounted a solenoid coil 32, having a magnetic plunger 33, carrying a valve 34, which is normally held open by a spring 35 to interconnect passages 36 and 37, respectively conected to the conduits 26 and 27. When the solenoid coil 32 is energized, by means later to be described, the valve 34 will be moved to and held in closed position to prevent return of liquid from the motors of the braking devices to the master cylinder.

The solenoid coil 32 is included in an electrical circuit, shown in Fig. 4 and supplied from the storage battery 38 of the vehicle. Included in series with the coil 32 and battery 38 in this circuit are the usual ignition switch 39, a switch 40, actuated by accelerator 5, and a pressure-actuated switch 41. The switch 40 is closed, when the accelerator 5 is in engine-idling position and will be opened when the accelerator is depressed from such position to any other position to actuate throttle 4. The pressure-actuated switch 41 includes contacts 42 and 43 respectively, fixed to the outer ends of spring fingers 44 and 45 which at their inner ends are suitably fixed and insulated one from another, as indicated. These spring fingers normally hold contacts 42 and 43 engaged and the switch closed. One finger 45 is extended beyond the other for actuation by a fluid pressure motor. This motor includes a suitable two-part casing 46, providing within it a pressure chamber 47, having a movable wall 48, which in the form shown is a diaphragm marginally clamped between the sections of the casing. The diaphragm has fixed thereto a plunger 49, which is slidably mounted in the lower part of the casing and extends outwardly therefrom in position to engage the outer end of finger 43 and move it to separate the contacts 42 and 43, when the diaphragm is deflected. A spring 50 holds the diaphragm in the illustrated position, in which the plunger 49 is lifted far enough to allow the contacts 42 and 43 to engage. A stop 50' on the casing liimts the movement of the diaphragm by fluid pressure.

The pressure chamber 47 is conected by a conduit 51 to the outlet 18 of pump 13 and a suitable non-return valve 52 is provided in this conduit and, as herein shown, at the outlet end of the conduit. The pressure chamber 47 is also connected by a vent conduit 53 to the upper part of the reservoir 18, where atmospheric pressure exists, as by means of passage 21 (Fig. 2). This vent conduit has an outlet orifice 54, which is formed between a conical valve element 55 and the adjacent peripheral wall of passage 56 in casing 46, the passage 56 being considered a part of the vent conduit. This orifice is of restricted area relatively to the inlet conduit 51. Liquid entering the chamber cannot return by conduit 51 and has to escape through the restricted vent conduit. The pump 13 builds up pressure, which increases with the speed of the propeller shaft from zero to a maximum. The switch 41 will open at a relatively low pressure, say for example 3 pounds per square inch. This occurs after accelerator 5 is depressed. The pump continues to build up pressure in chamber 47 as propeller shaft speed increases and the pressure may rise to relatively high values for example, as much as 65 pounds per square inch. The pressure in chamber 47 will increase with the speed of shaft 12. However, the pressure in this chamber will not decrease in proportion to propeller shaft speed but rather in proportion to time. It will take a certain time for liquid to escape from chamber 47 through the restricted orifice 54 and for the pressure to drop to a sufficiently low value to enable switch 41 to close. The time interval between the release of the accelerator and the closing of switch 41 will vary, depending on the speed of the propeller shaft at the time of release but there will be in all cases a time delay between the release of the accelerator and the closing of the switch 41, which will effect closing of the brakeholder valve since the accelerator switch has already been closed. This time delay affords important protection for the operator of the vehicle in that the brakeholder cannot be immediately rendered operative on too rapid deceleration of the vehicle. Suppose for example, that the vehicle is traveling on an icy surface, when the operator applies his brakes and that the wheels become locked so that the propeller shaft speed suddenly decreases to zero, the brakeholder will not operate because of the lack of the necessary time to cause closing of switch 41. Hence, the operator will be able to release his brake as he should under the circumstances. The size of orifice 54 determines the rate of pressure decrease in chamber 47 and may be varied to suit the conditions desired. In the particular example shown, the orifice 54 is made such that if the vehicle is decelerated at the uniform rate of 12 feet per second, the pressure will decrease sufficiently to allow switch 41 to close when the vehicle stops. If the deceleration of the vehicle exceeds such rate the switch 41 will not close until after the vehicle has been stopped. If the vehicle is coasted to a stop at as low a rate of deceleration as is possible, the switch 41 will close and apply the brakeholder at a vehicle speed of from 3 to 4 miles per hour.

The described rate of pressure decrease in chamber 47 is that which exists under normal conditions when the oil in the transmission is warmed up. To maintain this same rate at all times, the size of the vent orifice 54 may be varied as the temperature of the oil varies. One way in which this compensation may be effected is by mounting the valve element 55 on a bimetallic support 57, which is anchored at one end to casing. This support is shown in the position which it occupies, when the oil is cold. As the temperature of the oil increases, the outer end of the bimetallic support will bend upwardly moving element 55 to decrease the area of the vent orifice. Thus, on starting, when the oil is cold and less fluent, the desired rate of pressure decrease may be had to cause the brakeholder to be applied under the same conditions as above set forth for normal operation.

The invention also provides an improvement relating to the release of the brakeholder. Ordinarily, when the accelerator switch 40 is opened, the circuit through coil 32 is instantly broken and the brakeholder valve suddenly opens and causes a sudden release of pressure from the brake cylinders. This condition gives a sharp, jumpy release, particularly when the vehicle is headed downhill and has self energizing brakes. To overcome this difficulty, a ballast resistor, in this case a small electric lamp 58, is shunted across the accelerator switch. In this example a 3 c. p. 6-8 volt automotive type lamp is used. When the accelerator switch 40 is closed, the lamp is shunted out and full current is available to actuate the brakeholder. However, when switch 40 is opened the lamp is placed in series with the coil 32 of the brakeholder and by its resistance decreases the current flowing through the coil. The resistance of the lamp is relatively low at first but increases rapidly as the filament becomes heated, reaching a value such that the current through coil 32 is decreased sufficiently to allow valve 34 to open. The arrangement effects a relatively gradual reduction in current flow in the brakeholder coil 32 and avoids the sudden opening of valve 34 with the resulting sudden release of the brakes. The resistor need not necessarily be an electric lamp although that has been found to be a very simple and inexpensive expedient for the purpose.

In Figs. 5 and 6, there has been shown another means for compensating for temperature variations in the oil. In this case, the vent orifice 54' from chamber 47 is of constant area and the rate of outflow will vary with the temperature of the oil. However, the time required for any given pressure drop in chamber 47 may be kept the same by varying the volume of oil taken into the chamber, increasing such volume as the temperature of the oil increases. This may be done by moving the stop, which controls the fluid-pressure-movement of diaphragm 48, by means responsive to oil temperature. As one illustrative example, the diaphragm stop may consist of the upper end face of a nut 59, having a screw thread engagement with a hub 60 on the casing 46. This screw should have a steep pitch and may also, if necessary, consist of multiple threads so that a small angular movement of the nut will advance it axially a sufficient amount. The nut is turned by a bi-metallic spiral 61 located in the lower part of the casing and sufficiently near the oil to vary in temperature proportionately therewith. One end of the spiral is anchored to a pin 62, fixed to and upstanding from the lower wall of casing 46, and the other to a pin 63 fixed to and depending from nut 59. The stop 59 is shown elevated to its cold position. As the temperature of the oil increases, the stop will be lowered so that the diaphragm 48 can move farther and a greater volume of oil can be taken into the chamber 47 than when the stop was in its upper position. A greater volume of hot oil will escape from the chamber 47 in the same time required for the smaller volume of cold and more viscous oil. With this arrangement, for any given pressure drop, the time needed to decrease the pressure in chamber 47 to the value at which switch 41 will close, will be substantially the same regardless of the temperature of the oil.

In operation, the parts are initially positioned as in Fig. 4. Depression of the accelerator 5 will open switch 41 and cause the magnet 32 to be deenergized, allowing spring 35 to open valve 34 and release the fluid from the several brake cylinders. As the propeller shaft 12 is driven, the pump 13 will be driven and at speeds proportional thereto. Oil under pressure is forced into chamber 47 and, when it reaches a certain, and relatively low value, say 3 pounds per square inch the diaphragm 48 will be moved against stop 50' and switch 41 will be opened. Pressure will continue to build up in chamber 47, increasing as the speed of the propeller shaft increases. The increase in pressure is not necessarily in direct proportion to speed although in the case of the so-called "Hydromatic drive" it is approximately so for car speeds of from zero to about 30 miles per hour, after which further increases in car speed result in much smaller increases in pressure due to the action of a governor associated with the pump. Accordingly, the pressure in chamber 47 may rise to various values. Loss of pressure in the chamber 47 occurs solely by outflow through the vent orifice of the chamber and such outflow is at a definite time rate for any given temperature. Therefore, the decrease in pressure cannot occur instantly, as the speed of the propeller shaft might as in the case when the wheels are locked in a skid. There must be a time delay before the brakeholder can be rendered operative. Consequently, the brakes, if applied when the wheels are on an icy surface, causing locked wheels, cannot be held applied by the brakeholder but are free to be released by the operator if he releases pressure on the brake pedal. Thus, sudden stops will not result in immediate actuation of the brakeholder. The arrangement is preferably such that if the car is decelerated at a normal rate, the brakeholder will be applied when the car comes to a stop. Preferably also, compensation for variations in temperature of the oil is provided so that the brakeholder will function the same under the same conditions regardless of whether the car has been warmed up or not. Release of the brakeholder, occurring after the accelerator pedal is released, does not occur instantly, when switch 40 opens, but is delayed for a very short interval of time to produce a smoother release of fluid from the brake cylinders than is possible when the circuit to the brakeholder magnet is suddenly interrupted.

The invention thus provides improvements in the control mechanism for automatic brakeholders, such as are used on automotive vehicles and especially those employing fluid couplings in place of the mechanical clutch, for the purpose of preventing creeping of the vehicle after it has come to a stop and the brake pedal has been released. These improvements provide for an improved and smoother release of the brakeholder and also provide for a time delay in the application of the brakeholder measured from the start of deceleration of the propeller shaft of the vehicle to avoid immediate application of the brakeholder on sudden stops of the vehicle.

What is claimed is:

1. In an automotive vehicle, having an engine, a torque-transmitting connection from the engine including a clutch, transmission and propeller shaft for driving the vehicle wheels, an accelerator for controlling the engine, a fluid pressure braking system, a valve in said system operable when closed to hold the brakes applied, a pump driven with said shaft, a reservoir for liquid, a suction conduit connecting the reservoir to the inlet of the pump, a pressure motor including a chamber having a movable wall, a conduit connecting the outlet of the pump to said chamber, a non-return valve in the last-named conduit, a vent conduit from said chamber to said reservoir and having a restricted orifice retarding the outflow of liquid from the chamber, an operating connection between said wall and first-named valve, yieldable means acting on said wall with a predetermined and relatively low pressure to hold the first-named valve open, and means connecting the accelerator and first-named valve to open the latter when the accelerator is moved from engine-idling position, said pump producing pressure in said chamber which increases as the speed of said shaft increases, the pressure in said chamber decreasing, when said accelerator is released, at a time rate through said restricted orifice, whereby said first-named valve cannot close until the lapse of a certain time interval from the release of the accelerator irrespective of propeller shaft speed.

2. The combination claimed in claim 1, in which means responsive to the temperature of the liquid in said chamber are provided to make the time necessary for any given pressure drop in said chamber substantially the same for various temperatures of the liquid.

3. The combination as claimed in claim 1, in which means responsive to the temperature of said liquid are provided to control the area of said orifice increasing and decreasing it as the temperature of said liquid respectively decreases and increases.

4. The combination claimed in claim 1, in which a stop is provided to limit the movement of said movable wall by the action of liquid pressure, and means responsive to the temperature of the liquid in said chamber are provided to move said stop to increase or decrease the extent of movement of said wall as the temperature of the liquid respectively increases or decreases.

5. In an automotive vehicle, having an engine, a torque-transmitting connection from the engine including a clutch, transmission and propeller shaft for driving the vehicle wheels, an accelerator for controlling the engine, a fluid pressure braking system, a valve in said system operable when closed to hold the brakes applied, yieldable means holding said valve open, electrically-actuated means for closing said valve, a pump driven with said shaft, a reservoir for liquid, a suction conduit connecting the reservoir to the inlet of the pump, an accelerator switch in said circuit closed when the accelerator is in engine-idling position, a pressure-actuated switch in said circuit having a pressure chamber with a movable wall connected to the switch to open the same at a predetermined and relatively low pressure, a conduit connecting the outlet of the pump to said chamber, a non-return valve in the last-named conduit, a vent conduit from said chamber to said reservoir and having a restricted orifice retarding the outflow of liquid from the chamber, said pump producing pressure in said chamber which increases as the speed of said shaft increases, the pressure in said chamber decreasing, when said accelerator is released, at a time rate through said restricted orifice, whereby said first-named valve cannot close until the lapse of a certain time interval from the release of the accelerator irrespective of propeller shaft speed.

6. The combination claimed in claim 5, in which means responsive to the temperature of the liquid in said chamber are provided to make the time necessary for any given pressure drop in said chamber substantially the same for various temperatures of the liquid.

7. The combination as claimed in claim 5, in which means responsive to the temperature of said liquid are provided to control the area of said orifice increasing and decreasing it as the temperature of said liquid respectively decreases and increases.

8. The combination claimed in claim 5, in which a stop is provided to limit the movement of said movable wall by the action of liquid pressure, and means responsive to the temperature of the liquid in said chamber are provided to move said stop to increase or decrease the extent of movement of said wall as the temperature of the liquid respectively increases or decreases.

9. Brake control mechanism for automotive vehicles, comprising, electrically-actuated means for holding the brakes in applied condition after they have been applied, an energizing circuit for said means, an accelerator switch in said circuit closed when the accelerator is in engine-idling position and otherwise open, another switch in said circuit, means adapted to be driven from the propeller shaft of the vehicle for controlling said last-named switch, and a ballast resistor shunted across the accelerator switch and having a resistance which is low when cold and increases rapidly with current flow therethrough.

10. The combination claimed in claim 9 in which the ballast resistor is a small electric lamp.

KENNETH A. HARMON.
GLEN A. GUERNSEY.

REFERENCES CITED

The following references are of record in the file of this patent:

UNITED STATES PATENTS

| Number | Name | Date |
|---|---|---|
| 2,123,063 | Peters | July 5, 1938 |
| 2,287,301 | Freeman | June 23, 1942 |
| 2,340,502 | Baker | Feb. 1, 1944 |

FOREIGN PATENTS

| Number | Country | Date |
|---|---|---|
| 239,641 | Switzerland | Feb. 18, 1946 |